United States Patent
Palanca et al.

(10) Patent No.: US 6,584,547 B2
(45) Date of Patent: *Jun. 24, 2003

(54) SHARED CACHE STRUCTURE FOR TEMPORAL AND NON-TEMPORAL INSTRUCTIONS

(75) Inventors: Salvador Palanca, Folsom, CA (US); Niranjan L. Cooray, Folsom, CA (US); Angad Narang, Rancho Cordova, CA (US); Vladimir Pentkovski, Folsom, CA (US); Steve Tsai, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 09/803,357

(22) Filed: Mar. 9, 2001

(65) Prior Publication Data

US 2002/0007441 A1 Jan. 17, 2002

Related U.S. Application Data

(63) Continuation of application No. 09/053,386, filed on Mar. 31, 1998, now Pat. No. 6,202,129.

(51) Int. Cl.⁷ .............................................. G06F 12/00
(52) U.S. Cl. ...................... 711/133; 711/136; 711/128; 711/145; 711/144; 711/154; 711/155; 711/156
(58) Field of Search .......................... 711/118, 133, 711/136, 160, 128, 145, 144, 154, 155, 156, 159

(56) References Cited

U.S. PATENT DOCUMENTS

| | | | | |
|---|---|---|---|---|
| 5,829,025 A | * | 10/1998 | Mittal | 711/122 |
| 6,105,111 A | * | 8/2000 | Hammarlund et al. | 711/136 |
| 6,202,129 B1 | * | 3/2001 | Palanca et al. | 711/133 |
| 6,205,520 B1 | * | 3/2001 | Palanca et al. | 711/138 |
| 6,223,258 B1 | * | 4/2001 | Palanca et al. | 711/138 |
| 6,434,671 B2 | * | 8/2002 | Chung | 711/129 |

FOREIGN PATENT DOCUMENTS

WO  WO 99/50752  * 10/1999  .......... G06F/12/08

* cited by examiner

*Primary Examiner*—Hong Kim
(74) *Attorney, Agent, or Firm*—Blakely, Sokoloff, Taylor & Zafman LLP

(57) ABSTRACT

A method and system for providing cache memory management. The system comprises a main memory, a processor coupled to the main memory, and at least one cache memory coupled to the processor for caching of data. The at least one cache memory has at least two cache ways, each comprising a plurality of sets. Each of the plurality of sets has a bit which indicates whether one of the at least two cache ways contains non-temporal data. The processor accesses data from one of the main memory or the at least one cache memory.

15 Claims, 11 Drawing Sheets

| | Cache Access Status | Instruction Type | Mode bit status | LRU lock bit (70) status prior to access | LRU lock bit (70) status after cache access | (Regular or Pseudo) LRU bit 60 status |
|---|---|---|---|---|---|---|
| 1 | Hit | T | X | 0 | 0 (not updated) | Updated according to LRU technique used |
| 2 | Hit | T | X | 1 | 1 (not updated) | Not updated |
| 3 | Hit | NT | 0 | 0 or 1 | Not updated | Not updated |
| 4 | Hit | NT | 1 | 0 or 1 | 1 | Updated to the way that was hit |
| 5 | Miss | T | X | 0 or 1 | 0 | Updated according to LRU technique used |
| 6 | Miss | NT | X | 0 or 1 | 1 | Not updated (since LRU bit 60 points to the way to be replaced, and it is not updated, it will point to the non-temporal data.) |

FIG. 4

X: Don't Care

|  | LRU Lock Bit | Pseudo LRU | DATA | | | |
|---|---|---|---|---|---|---|
|  |  |  | way 0 | way 1 | way 2 | way 3 |
| set 0 | 0 | way 0 |  |  |  |  |
| set 1 |  |  |  |  |  |  |

FIG. 5A

|  | LRU Lock Bit | Pseudo LRU | DATA | | | |
|---|---|---|---|---|---|---|
|  |  |  | way 0 | way 1 | way 2 | way 3 |
| set 0 | 0 | way 3 |  |  |  |  |
| set 1 |  |  |  |  |  |  |

FIG. 5B

|  | LRU Lock Bit | Pseudo LRU | DATA | | | |
|---|---|---|---|---|---|---|
|  |  |  | way 0 | way 1 | way 2 | way 3 |
| set 0 | 1 | way 0 |  |  |  |  |
| set 1 . . |  |  |  |  |  |  |

FIG. 6A

|  | LRU Lock Bit | Pseudo LRU | DATA | | | |
|---|---|---|---|---|---|---|
|  |  |  | way 0 | way 1 | way 2 | way 3 |
| set 0 | 1 | way 0 |  |  |  |  |
| set 1 . . |  |  |  |  |  |  |

FIG. 6B

|  | LRU Lock Bit | Pseudo LRU | DATA | | | |
|---|---|---|---|---|---|---|
|  |  |  | way 0 | way 1 | way 2 | way 3 |
| set 0 | 0 | way 0 |  |  |  |  |
| set 1 |  |  |  |  |  |  |

FIG. 7A

|  | LRU Lock Bit | Pseudo LRU | DATA | | | |
|---|---|---|---|---|---|---|
|  |  |  | way 0 | way 1 | way 2 | way 3 |
| set 0 | 0 | way 0 |  |  |  |  |
| set 1 |  |  |  |  |  |  |

FIG. 7B

|  | LRU Lock Bit | Pseudo LRU | DATA | | | |
|---|---|---|---|---|---|---|
|  |  |  | way 0 | way 1 | way 2 | way 3 |
| set 0 | 1 | way 0 |  |  |  |  |
| set 1 ⋮ |  |  |  |  |  |  |

FIG. 7C

|  | LRU Lock Bit | Pseudo LRU | DATA | | | |
|---|---|---|---|---|---|---|
|  |  |  | way 0 | way 1 | way 2 | way 3 |
| set 0 | 1 | way 0 |  |  |  |  |
| set 1 ⋮ |  |  |  |  |  |  |

FIG. 7D

|  | LRU Lock Bit | Pseudo LRU | way 0 | way 1 | way 2 | way 3 |
|---|---|---|---|---|---|---|
|  |  |  | \multicolumn{4}{c}{DATA} |
| set 0 | 1 | way 0 |  |  |  |  |
| set 1 <br> . <br> . |  |  |  |  |  |  |

FIG. 8C

|  | LRU Lock Bit | Pseudo LRU | way 0 | way 1 | way 2 | way 3 |
|---|---|---|---|---|---|---|
|  |  |  | \multicolumn{4}{c}{DATA} |
| set 0 | 1 | way 2 |  |  |  |  |
| set 1 <br> . <br> . |  |  |  |  |  |  |

FIG. 8D

|  | LRU Lock Bit | Pseudo LRU | DATA ||||
|---|---|---|---|---|---|---|
|  |  |  | way 0 | way 1 | way 2 | way 3 |
| set 0 | 1 | way 0 |  |  |  |  |
| set 1 ⋮ |  |  |  |  |  |  |

FIG. 9A

|  | LRU Lock Bit | Pseudo LRU | DATA ||||
|---|---|---|---|---|---|---|
|  |  |  | way 0 | way 1 | way 2 | way 3 |
| set 0 | 0 | way 3 |  |  |  |  |
| set 1 ⋮ |  |  |  |  |  |  |

FIG. 9B

|       | LRU Lock Bit | Pseudo LRU | DATA | | | |
|-------|--------------|------------|-------|-------|-------|-------|
|       |              |            | way 0 | way 1 | way 2 | way 3 |
| set 0 | 0            | way 0      |       |       |       |       |
| set 1 |              |            |       |       |       |       |

FIG. 10A

|       | LRU Lock Bit | Pseudo LRU | DATA | | | |
|-------|--------------|------------|-------|-------|-------|-------|
|       |              |            | way 0 | way 1 | way 2 | way 3 |
| set 0 | 1            | way 0      |       |       |       |       |
| set 1 |              |            |       |       |       |       |

FIG. 10B

SHARED CACHE STRUCTURE FOR TEMPORAL AND NON-TEMPORAL INSTRUCTIONS

CROSS REFERENCE TO RELATED APPLICATION

This application claims the benefit and is a continuation of application Ser. No. 09/053,386, filed Mar. 31, 1998 now U.S. Pat. No. 6,202,129.

BACKGROUND OF THE INVENTION

1. Field of the Invention

The present invention relates in general to the field of processors, and in particular, to a technique of providing a shared cache structure for temporal and non-temporal instructions.

2. Description of the Related Art

The use of a cache memory with a processor facilitates the reduction of memory access time. The fundamental idea of cache organization is that by keeping the most frequently accessed instructions and data in the fast cache memory, the average memory access time will approach the access time of the cache. To achieve the maximum possible speed of operation, typical processors implement a cache hierarchy, that is, different levels of cache memory. The different levels of cache correspond to different distances from the processor core. The closer the cache is to the processor, the faster the data access. However, the faster the data access, the more costly it is to store data. As a result, the closer the cache level, the faster and smaller the cache.

The performance of cache memory is frequently measured in terms of its hit ratio. When the processor refers to memory and finds the word in cache, it is said to produce a hit. If the word is not found in cache, then it is in main memory and it counts as a miss. If a miss occurs, then an allocation is made at the entry indexed by the access. The access can be for loading data to the processor or storing data from the processor to memory. The cached information is retained by the cache memory until it is no longer needed, made invalid or replaced by other data, in which instances the cache entry is de-allocated.

In processors implementing a cache hierarchy, such as the Pentium Pro™ processors which have an L1 and an L2 cache, the faster and smaller L1 cache is located closer to the processor than the L2 cache. When the processor requests cacheable data, for example, a load instruction, the request is first sent to the L1 cache. If the requested data is in the L1 cache, it is provided to the processor. Otherwise, there is an L1 miss and the request is transferred to the L2 cache. Likewise, if there is an L2 cache hit, the data is passed to the L1 cache and the processor core. If there is an L2 cache miss, the request is transferred to main memory. The main memory responds to the L2 cache miss by providing the requested data to the L2 cache, the L1 cache, and to the processor core.

The type of data that is typically stored in cache includes active portions of programs and data. When the cache is full, it is necessary to replace existing lines of stored data in the cache memory to make room for newly requested lines of data. One such replacement technique involves the use of the least recently used (LRU) algorithm, which replaces the least recently used line of data with the newly requested line. In the Pentium Pro™ processors, since the L2 cache is larger than the L1 cache, the L2 cache typically stores everything in the L1 cache and some additional lines that have been replaced in the L1 cache by the LRU algorithm.

U.S. patent application Ser. No. 08/767,950 filed Dec. 17, 1996, now U.S. Pat. No. 5,829,025, entitled "Computer System and Method of Allocating Cache Memories in a Multilevel Cache Hierarchy utilizing a Locality Hint within an Instruction" by Milland Mittal, discloses a technique for allocating cache memory through the use of a locality hint associated with an instruction. When a processor accesses memory for transfer of data between the processor and the memory, that access can be allocated to the various levels of cache, or not allocated to cache memory at all, according to the locality hint associated with the instruction. Certain instructions are used infrequently. For example, non-temporal prefetch instructions preload data which the processor does not require immediately, but which are anticipated to be required in the near future. Such data is typically used only once or will not be reused in the immediate future, and is termed "non-temporal data". Instructions that are frequently used are termed "temporal data". For non-temporal data, since the data is used infrequently, optimal performance dictates that the cached application code and data not be overwritten by this infrequently used data. U.S. Pat. No. 5,829,025 solves this problem by providing a buffer, separate from the cache memory, for storing the infrequently used data, such as non-temporal prefetched data. However, the use of an extra, separate buffer is expensive both in terms of cost and space.

Accordingly, there is a need in the technology for providing a shared cache structure for temporal and non-temporal instructions, which eliminates the use of a separate buffer.

BRIEF SUMMARY OF THE INVENTION

A method and system for providing cache memory management. The system comprises a main memory, a processor coupled to the main memory, and at least one cache memory coupled to the processor for caching of data. The at least one cache memory has at least two cache ways, each comprising a plurality of sets. Each of the plurality of sets has a bit which indicates whether one of the at least two cache ways contains non-temporal data. The processor accesses data from one of the main memory or the at least one cache memory.

BRIEF DESCRIPTION OF THE DRAWINGS

The invention is illustrated by way of example, and not limitation, in the figures. Like reference indicate similar elements.

FIG. 4 is a table illustrating the cache management technique, according to one embodiment of the present invention.

FIGS. 5A and 5B illustrate one example of the organization of a cache memory prior to and after temporal instruction hits way 2 of cache set 0, according to one embodiment of the present invention.

FIGS. 6A and 6B illustrate another example of the organization of a cache memory prior to and after temporal instruction hits way 2 of cache set 0, according to one embodiment of the present invention.

FIGS. 7A–7D illustrate a example of the organization of a cache memory prior to and after a non-temporal instruction hits way 2 of cache set 0, according to one embodiment of the present invention.

FIGS. 8A–8D illustrate another example of the organization of a cache memory prior to and after a non-temporal instruction hits way 2 of cache set 0, according to one embodiment of the present invention.

FIGS. 9A and 9B illustrate one example of the organization of a cache memory prior to and after a temporal instruction miss to cache set 0, according to one embodiment of the present invention.

FIGS. 10A–10B illustrate an example of the organization of a cache memory prior to and after a non-temporal instruction miss to cache set 0, according to one embodiment of the present invention.

DETAILED DESCRIPTION OF THE INVENTION

A technique is described for providing management of cache memories, in which cache allocation is determined by data utilization. In the following description, numerous specific details are set forth, such as specific memory devices, circuit diagrams, processor instructions, etc., in order to provide a thorough understanding of the present invention. However, it will be appreciated by one skilled in the art that the present invention may be practiced without these specific details. In other instances, well known techniques and structures have not been described in detail in order not to obscure the present invention. It is to be noted that a particular implementation is described as a preferred embodiment of the present invention, however, it is readily understood that other embodiments can be designed and implemented without departing from the spirit and scope of the present invention. Furthermore, it is appreciated that the present invention is described in reference to a serially arranged cache hierarchy system, but it need not be limited strictly to such a hierarchy.

Figure 1:
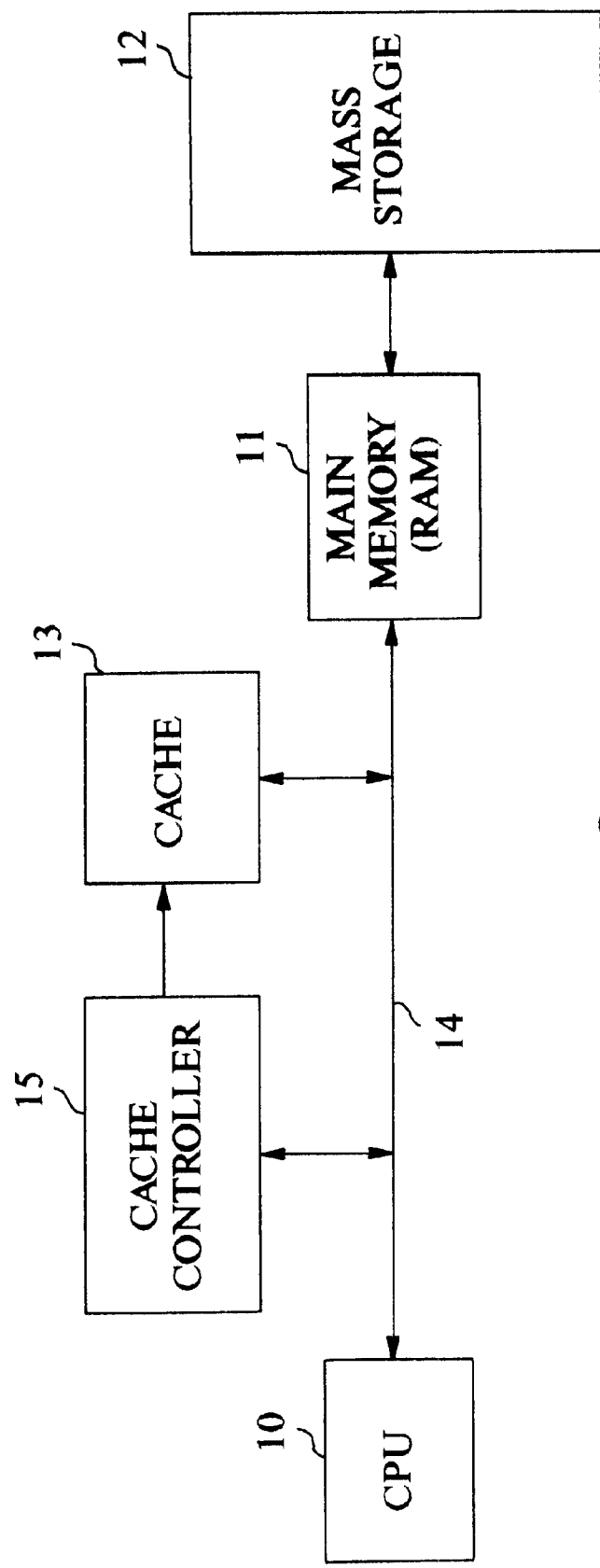
FIG. 1 illustrates a circuit block diagram of one embodiment of a computer system which implements the present invention, in which a cache memory is used for data accesses between a main memory and a processor of the computer system.

Referring to FIG. 1, a typical computer system is shown, wherein a processor 10, which forms the central processing unit (CPU) of the computer system is coupled to a main memory 11 by a bus 14. The main memory 11 is typically comprised of a random-access-memory and is usually referred to as RAM. Subsequently, the main memory 11 is generally coupled to a mass storage device 12, such as a magnetic or optical memory device, for mass storage (or saving) of information. A cache memory 13 (hereinafter also referred simply as cache) is coupled to the bus 14 as well. The cache 13 is shown located between the CPU 11 and the main memory 11, in order to exemplify the functional utilization and transfer of data associated with the cache 13. It is appreciated that the actual physical placement of the cache 13 can vary depending on the system and the processor architecture. Furthermore, a cache controller 15 is shown coupled to the cache 13 and the bus 14 for controlling the operation of the cache 13. The operation of a cache controller, such as the controller 15, is known in the art and, accordingly, in the subsequent Figures, cache controllers are not illustrated. It is presumed that some controller(s) is/are present under control of the CPU 10 to control the operation of cache(s) shown.

In operation, information transfer between the memory 11 and the CPU 10 is achieved by memory accesses from the CPU 10. When cacheable data is currently or shortly to be accessed by the CPU 10, that data is first allocated in the cache 13. That is, when the CPU 10 accesses a given information from the memory 11, it seeks the information from the cache 13. If the accessed data is in the cache 13, a "hit" occurs. Otherwise, a "miss" results and cache allocation for the data is sought. As currently practiced, most accesses (whether load or store) require the allocation of the cache 13. Only uncacheable accesses are not allocated in the cache.

Figure 2:
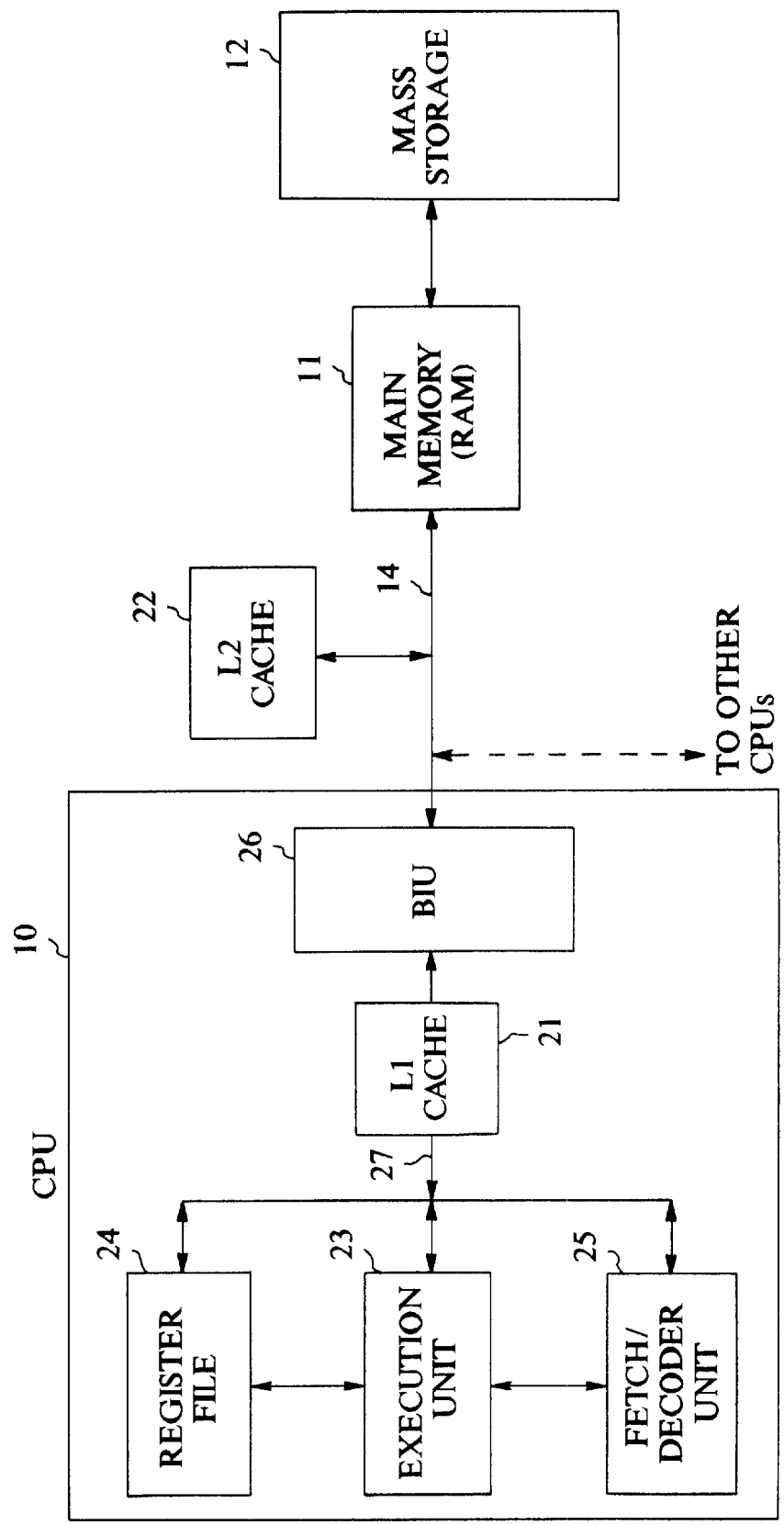
FIG. 2 is a circuit block diagram of a second embodiment of a computer system which implements the present invention, in which two cache memories are arranged into cache memory levels for accessing data between a main memory and a processor(s) of the computer system.

Referring to FIG. 2, a computer system implementing a multiple cache arrangement is shown. The CPU 10 is still coupled to the main memory 11 by the bus 14 and the memory 11 is then coupled to the mass storage device 12. However, in the example of FIG. 2, two separate cache memories 21 and 22 are shown. The caches 21–22 are shown arranged serially and each is representative of a cache level, referred to as Level 1 (L1) cache and Level 2 (L2) cache, respectively. Furthermore, the L1 cache 21 is shown as part of the CPU 10, while the L2 cache 22 is shown external to the CPU 10. This structure exemplifies the current practice of placing the L1 cache on the processor chip while lower level caches are placed external to it, where the lower level caches are further from the processor core. The actual placement of the various cache memories is a design choice or dictated by the processor architecture. Thus, it is appreciated that the L1 cache could be placed external to the CPU 10.

Generally, CPU 10 includes an execution unit 23, register file 24 and fetch/decoder unit 25. The execution unit 23 is the processing core of the CPU 10 for executing the various arithmetic (or non-memory) processor instructions. The register file 24 is a set of general purpose registers for storing (or saving) various information required by the execution unit 23. There may be more than one register file in more advanced systems. The fetch/decoder unit 25 fetches instructions from a storage location (such as the main memory 11) holding the instructions of a program that will be executed and decodes these instructions for execution by the execution unit 23. In more advanced processors utilizing pipelined architecture, future instructions are prefetched and decoded before the instructions are actually needed so that the processor is not idle waiting for the instructions to be fetched when needed.

The various units 23–25 of the CPU 10 are coupled to an internal bus structure 27. A bus interface unit (BIU) 26 provides an interface for coupling the various units of CPU 10 to the bus 14. As shown in FIG. 2, the L1 cache is coupled to the internal bus 27 and functions as an internal cache for the CPU 10. However, again it is to be emphasized that the L1 cache could reside outside of the CPU 10 and coupled to the bus 14. The caches can be used to cache data, instructions or both. In some systems, the L1 cache is actually split into two sections, one section for caching data and one section for caching instructions. However, for simplicity of explanation, the various caches described in the Figures are shown as single caches with data, instructions and other information all referenced herein as data. It is appreciated that the operations of the units shown in FIG. 2 are known. Furthermore it is appreciated that the CPU 10 actually includes many more components than just the components shown. Thus, only those structures pertinent to the understanding of the present invention are shown in FIG. 2. In one embodiment, the invention is utilized in systems having data caches. However, the invention is applicable to any type of cache.

It is also to be noted that the computer system may be comprised of more than one CPU (as shown by the dotted line in FIG. 2). In such a system, it is typical for multiple CPUs to share the main memory 11 and/or mass storage unit 12. Accordingly, some or all of the caches associated with the computer system may be shared by the various processors of the computer system. For example, with the system of FIG. 2, L1 cache 21 of each processor would be utilized by its processor only, but the main memory 11 would be shared by all of the CPUs of the system. In addition, each CPU has an associated external L2 cache 22.

The invention can be practiced in a single CPU computer system or in a multiple CPU computer system. It is further noted that other types of units (other than processors) which access memory can function equivalently to the CPUs described herein and, therefore, are capable of performing the memory accessing functions similar to the described CPUs. For example, direct memory accessing (DMA) devices can readily access memory similar to the processors described herein. Thus, a computer system having one processor (CPU), but one or more of the memory accessing units would function equivalent to the multiple processor system shown and described herein.

As noted, only two caches 21–22 are shown. However, the computer system need not be limited to only two levels of cache. It is now a practice to utilize a third level (L3) cache in more advanced systems. It is also the practice to have a serial arrangement of cache memories so that data cached in the L1 cache is also cached in the L2 cache. If there happens to be an L3 cache, then data cached in the L2 cache is typically cached in the L3 cache as well. Thus, data cached at a particular cache level is also cached at all higher levels of the cache hierarchy.

Figure 3:
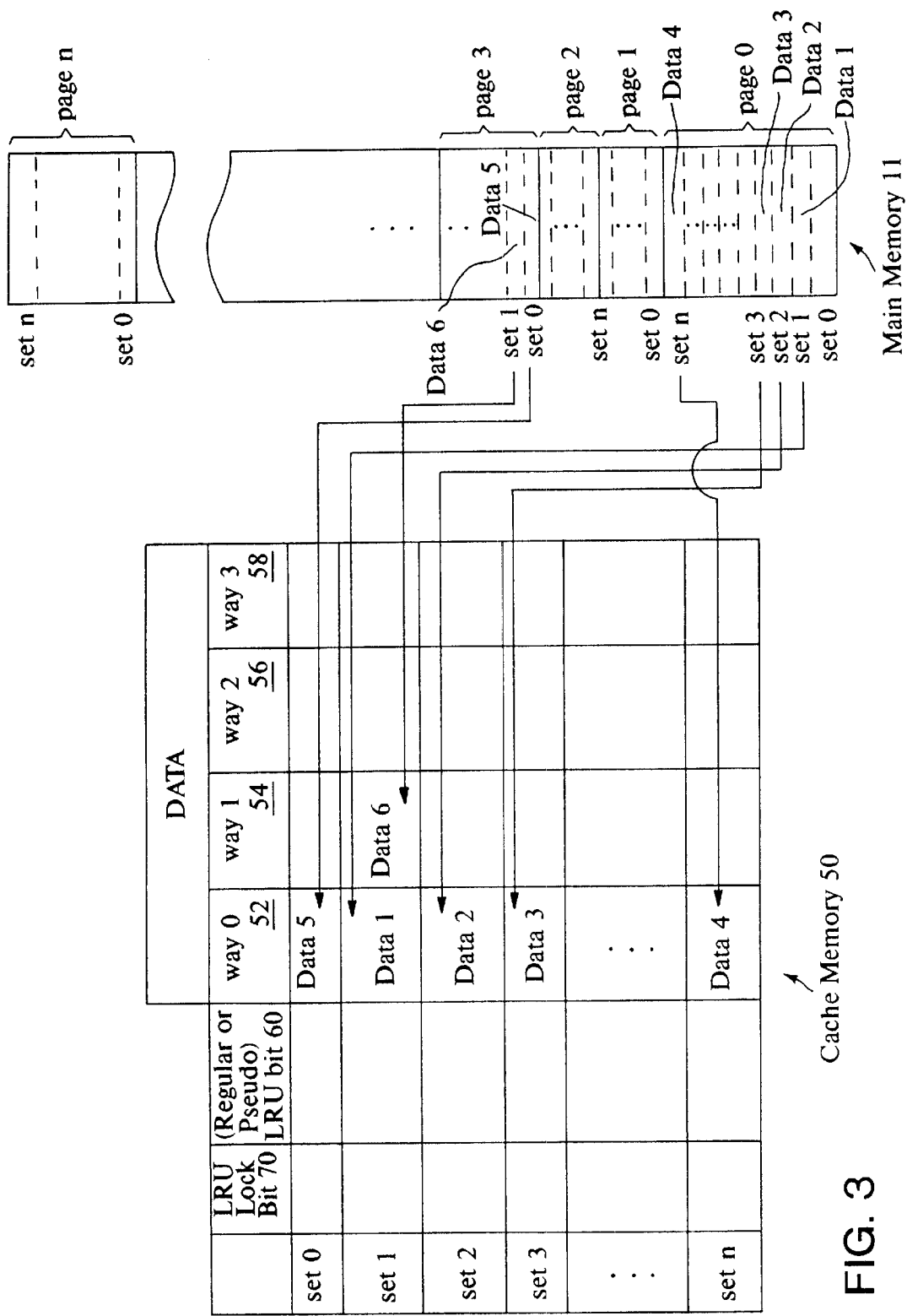
FIG. 3 is a block diagram illustrating one embodiment of the organizational structure of the cache memory in which the technique of the present invention is implemented.

FIG. 3 is a block diagram illustrating one embodiment of the organizational structure of the cache memory in which the technique of the present invention is implemented. In general, there are "x" sets in a cache structure, "y" ways per set (where $y \geq 2$), and where each way contains one data entry or one cache line. The invention provides an LRU lock bit per cache set which indicates whether any one of the ways within that set contains non-temporal (NT) data. If so, the regular or pseudo LRU bits will be updated to point to the NT data. There are also "z" regular or pseudo LRU bits per set. Unless the LRU lock bit is set, the regular or pseudo LRU bits point to the way within the set in accordance with the least recently used technique implemented. The number of regular or pseudo-LRU bits per set varies depending on the number of ways per set and the LRU (regular or pseudo) technique implemented.

In the embodiment as shown, the cache 50 is organized as a four-way set associative cache. In the example of FIG. 3, each page is shown as being equal to one-fourth the cache size. In particular, the cache 50 is divided into four ways (for example, way 0 (52), way 1 (54), way 2 (56) and way 3 (58)) of equal size and main memory 11 (see also FIGS. 1 and 2) is viewed as divided into pages (e.g., page 0-page n). In another embodiment, each page may be larger or smaller than the cache size. The organizational structure of cache 50 (as shown in FIG. 3) may be implemented within the cache 13 of FIG. 1, the L1 cache 21 and/or L2 cache 22 of FIG. 2.

The cache 50 also includes an array of least recently used (LRU) bits $60_0$-$60_n$ each of which points to the way within a set with the least recently used data (or NT data, if a biased LRU technique is implemented). Such listing is performed in accordance with an LRU technique under the control of the cache controller 15, to determine which cache entry to overwrite in the event that a cache set is full. The LRU logic (not shown) keeps track of the cache locations within a set that have been least recently used. In one embodiment, an LRU technique that strictly keeps track of the least-recently used directory algorithm may be implemented. In one alternate embodiment, a pseudo-LRU algorithm which makes a best attempt at keeping track of the least recently used directory element, is implemented. For discussion purposes, the bits $60_0$-$60_n$ will be referred to as LRU bits $60_0$-$60_n$, while the array of LRU bits $60_0$-$60_n$ will be referred to as LRU bit 60.

The cache 50 further includes an array of LRU lock bits $70_0$-$70_n$ which indicates whether any of the ways 52, 54, 56, 58 within a given set contains data that should not pollute the cache 50 (i.e., data with infrequent usage), as described in detail in the following sections.

FIG. 4 is a table illustrating the cache management technique in accordance with the principles of the present invention. The invention utilizes the array of LRU lock bits $70_0$-$70_n$ to indicate whether any of the corresponding cached data is streaming or non-temporal, and as such, would be the first entry to be replaced upon a cache miss to the corresponding set. In one embodiment, the LRU lock bit 70, when set to 1, indicates that the corresponding set has an entry that is non-temporal. If the LRU lock bit 70 is cleared, upon a cache hit by a temporal instruction, the corresponding LRU bit(s) 60 is (are) updated in accordance with the LRU technique implemented (see item 1 of FIG. 4) and the associated LRU lock bit is not updated. However, if the LRU lock bit 70 is already set to 1 (indicating that the corresponding set has a non-temporal instruction), the LRU lock bit 70 is not updated, and the LRU bit 60 is not updated (see item 2).

In the case of a cache hit by a non-temporal instruction, the LRU bit 60 and the LRU lock bit 70 are not updated, regardless of the status of the LRU lock bit 70 (see item 3). In an alternate embodiment, as controlled through a mode bit in a control register in the L1 cache controller, cache hits by a streaming or non-temporal instructions force the LRU bits to the way that was hit (see item 4). In addition, the LRU lock bit 70 is set to 1. In this embodiment, the data hit by the streaming or non-temporal instruction will be the first to be replaced upon a cache miss to the corresponding set.

Upon a cache miss by a temporal instruction, the LRU lock bit is cleared and the LRU bit 60 is updated (item 5) based on a pseudo LRU technique. However, upon a cache miss by a streaming or non-temporal instruction, the LRU lock bit 70 is set to 1 and the corresponding LRU bit 60 is not updated (item 6).

Examples of each of the items provided in the table of FIG. 4 will now be discussed. FIGS. 5A and 5B illustrate one example of the organization of a cache memory prior to and after temporal instruction hits way 2 of cache set 0. This example corresponds to item 1 of FIG. 4. Here, LRU lock bit $70_0$ had been previously cleared for cache set 0, and since the cache set 0 was hit by a temporal instruction, the LRU lock bit $70_0$ is not updated. However, the LRU bit $60_0$ is updated in accordance with the LRU technique implemented. In the example, it is assumed that the pseudo LRU technique indicates that way 3 is the least recently used entry.

FIGS. 6A and 6B illustrate another example of the organization of a cache memory prior to and after temporal instruction hits way 2 of cache set 0. This example corresponds to item 2 of FIG. 4. Here, LRU lock bit $70_0$ had been previously set for cache set 0, indicating that the corresponding set contains non-temporal data. Accordingly, neither the LRU lock bit $70_0$ nor the LRU bit $60_0$ is updated.

FIGS. 7A–7D illustrate an example of the organization of a cache memory prior to and after a non-temporal instruction hits way 2 of cache set 0. This example corresponds to item 3 of FIG. 4 and may be implemented by setting a mode bit located in the L1 cache controller to zero (see FIG. 4). In the first case (FIGS. 7A and 7B), LRU lock bit $70_0$ had been previously cleared for cache set 0. In this embodiment, a non-temporal cache hit does not update the LRU lock bit 70. Accordingly, since the cache set 0 was hit by a non-temporal instruction, neither the LRU lock bit $70_0$ nor the LRU bit $60_0$ is updated. In the second case (FIGS. 7C and 7D), LRU lock bit $70_0$ had been previously set for cache set 0, indicating that the corresponding set contains non-temporal data. Accordingly, neither the LRU lock bit $70_0$ nor the LRU bit $60_0$ is updated.

FIGS. 8A–8D illustrate another example of the organization of a cache memory prior to and after a non-temporal instruction hits way 2 of cache set 0. This example corresponds to item 4 of FIG. 4 and may be implemented by setting the mode bit located in the L1 cache controller to one (see FIG. 4). In the first case (FIGS. 8A and 8B), LRU lock bit $70_0$ had been previously cleared for cache set 0. In this example of an alternate embodiment to that example shown in FIGS. 7A–7D, a non-temporal cache hit updates the LRU lock bit 70. Accordingly, as shown in FIG. 8A, since the cache set 0 was hit by a non-temporal instruction, the LRU lock bit $70_0$ is updated (set to 1), as shown in FIG. 8B. In addition, the LRU bits $60_0$ are updated to indicate the way that was hit. In the case where LRU lock bit $70_0$ had been previously set for cache set 0 (FIGS. 8C and 8D), the LRU lock bit $70_0$ remains set to 1. In addition, the LRU bits $60_0$ are forced to point to the way within the set that was hit.

FIGS. 9A and 9B illustrate one example of the organization of a cache memory prior to and after a temporal instruction miss to cache set 0. This example corresponds to item 5 of FIG. 4. Here, LRU lock bit $70_0$ had been previously set for cache set 0, and since there is a miss by a temporal instruction targeting set 0, the LRU lock bit $70_0$ is cleared for that set, upon replacing the temporal miss in the cache. However, the LRU bit $60_0$ is updated in accordance with the LRU technique implemented. In the example, the pseudo LRU technique indicates that way 3 is the least recently used entry.

FIGS. 10A–10B illustrate an example of the organization of a cache memory prior to and after a non-temporal instruction miss to cache set 0. This example corresponds to item 6 of FIG. 4. In this case, LRU lock bit $70_0$ had been previously cleared for cache set 0. Since there is a non-temporal miss to cache set 0, the LRU lock bit $70_0$ is set and the LRU bits $60_0$ remain the same, in order to point to the non-temporal data in the corresponding set 0.

By implementing the apparatus and method of the present invention, a shared cache structure for managing temporal and non-temporal instructions, which minimizes data pollution in cache or cache hierarchy is provided. Implementation of the present invention also eliminates the use of a separate buffer, making its implementation both cost effective and efficient.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. An apparatus for processing temporal and non-temporal data comprising:

a memory means;

a processor means coupled to the memory means, the processor means to execute instructions to process non-temporal data and temporal data; cache memory means coupled to the processor means, the cache memory means having at least two cache ways each comprising a plurality of sets, each of the plurality of sets having a first bit indicative of whether one of the at least two cache ways contains non-temporal data that can be replaced first and a second bit indicative of an order of data entry in a corresponding cache way; and wherein the processor means accesses data from the memory means or the cache memory means.

2. The apparatus of claim 1, wherein the first bit is a lock bit.

3. The apparatus of wherein the second bit is a least recently used bit.

4. The apparatus of claim 1, wherein the non-temporal data is a type of data that is predetermined to be infrequently used by the processor means.

5. The apparatus of claim 1, wherein the non-temporal data is a type of data that is streaming data that need not be cached in the cache memory means.

6. The apparatus of claim 1, wherein the first bit is set to indicate that one of the at least two cache ways in an associated set contains the non-temporal data which is replaced upon a cache miss.

7. The apparatus of claim 6, wherein the associated set contains the non-temporal data and the second bit points to the non-temporal data in one of the at least two cache ways therein.

8. The apparatus of claim 1, wherein the first bit is cleared to indicate that none of the at least two cache ways in the associated set contains the non-temporal data.

9. The apparatus of claim 1, further comprising:

cache control means coupled to the cache memory means and the processor means, the cache control means to control the cache memory means.

10. The apparatus of claim 9, wherein the processor means receives an instruction for accessing data, if the processor means determines that the data is located in the cache memory means then the data is accessed from the cache memory means, otherwise the data is accessed from the memory means.

11. The apparatus of claim 10, wherein if the data is accessed from the cache memory means, the cache control means determines if the data is temporal, if the data is temporal and if the first bit is not set to indicate non-temporal data, then the cache control means updates an order of the second bit corresponding to the way that is being accessed, otherwise the cache control means leaves the order of the second bit unchanged.

12. The apparatus of claim 11, wherein the first bit is unchanged.

13. The apparatus of claim 10, wherein if the data that is being accessed from the cache memory means is non-temporal, then the cache control means sets the first bit to indicate that the accessed data is non-temporal and updates the order of the second bit.

14. The apparatus of claim 10, wherein if the data is being accessed from the memory means then the cache control means determines if the data is non-temporal, if the data being accessed is non-temporal, then the cache control means sets the first bit to indicate that the accessed data is non-temporal and leaves unchanged the order of the second bit.

15. The apparatus of claim 14, wherein if the cache control means determines that the data being accessed is temporal, then the cache control means sets the first bit to indicate that the accessed data is temporal and updates the order of the second bit.

\* \* \* \* \*

UNITED STATES PATENT AND TRADEMARK OFFICE
CERTIFICATE OF CORRECTION

PATENT NO.    : 6,584,547 B2
DATED         : June 24, 2003
INVENTOR(S)   : Palanca et al.

It is certified that error appears in the above-identified patent and that said Letters Patent is hereby corrected as shown below:

<u>Title page,</u>
Item [75], Inventors, insert -- Mohammad Abdallah, Folsom, CA (US) --.

Signed and Sealed this

First Day of June, 2004

JON W. DUDAS
*Acting Director of the United States Patent and Trademark Office*